United States Patent
Ito

(10) Patent No.: US 9,516,458 B2
(45) Date of Patent: Dec. 6, 2016

(54) IMAGE FORMING APPARATUS EQUIPPED WITH NFC TAG, METHOD OF CONTROLLING THE SAME, AND STORAGE MEDIUM

(71) Applicant: CANON KABUSHIKI KAISHA, Tokyo (JP)

(72) Inventor: Chie Ito, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/729,243

(22) Filed: Jun. 3, 2015

(65) Prior Publication Data

US 2015/0358761 A1    Dec. 10, 2015

(30) Foreign Application Priority Data

Jun. 4, 2014   (JP) .................................. 2014-115748

(51) Int. Cl.
*H04W 4/00* (2009.01)
*H04B 5/00* (2006.01)

(52) U.S. Cl.
CPC .......... *H04W 4/008* (2013.01); *H04B 5/0031* (2013.01); *H04B 5/0056* (2013.01)

(58) Field of Classification Search
CPC .................................................... H04W 4/008
USPC ..................... 455/41.1, 41.2, 41.3
See application file for complete search history.

(56) References Cited

U.S. PATENT DOCUMENTS

| | | | | |
|---|---|---|---|---|
| 2013/0040561 A1* | 2/2013 | Conde e Silva | ...... | H04W 4/008 455/41.1 |
| 2014/0017996 A1* | 1/2014 | Hamilton | ............. | H04W 4/008 455/41.1 |
| 2014/0038519 A1* | 2/2014 | Asakura | ................ | H04W 76/04 455/41.1 |
| 2014/0106733 A1* | 4/2014 | Wei | ......................... | H04W 8/24 455/418 |
| 2014/0194105 A1* | 7/2014 | Lee | .......................... | H04L 67/34 455/418 |
| 2014/0244786 A1* | 8/2014 | Shapira | .................... | H04L 67/02 709/217 |
| 2014/0355057 A1* | 12/2014 | Jang | .................... | G06K 7/10297 358/1.15 |
| 2015/0087288 A1* | 3/2015 | Dharawat | ............. | H04W 4/005 455/419 |

FOREIGN PATENT DOCUMENTS

JP          2013045462 A       3/2013

* cited by examiner

*Primary Examiner* — Wen Huang
(74) *Attorney, Agent, or Firm* — Rossi, Kimms & McDowell LLP

(57) ABSTRACT

A technique enabling automatic start of a desired application without being dependent on an OS of a mobile terminal only by causing the terminal to touch an image forming apparatus. The apparatus is equipped with an NFC tag capable of performing short-range wireless communication with the terminal. A Web browser operating on the terminal accesses an RUI of the apparatus. User agent information is acquired from the Web browser having accessed the RUI. The OS of the terminal is determined based on the acquired user agent information. Application information is written in the NFC tag based on the determined OS. A mobile NFC reader/writer of the terminal reads the application information, and if the associated application has been installed in the terminal, the application is started, whereas if not, an application download service is started to download the application.

9 Claims, 11 Drawing Sheets

FIG. 8

| OS | TYPE | APPLICATION PACKAGE NAME |
|---|---|---|
| ANDROID | android.com:pkg | com.xxx.jp |
| XXX | example.com:ext | com.xxx.jp |
| YYY | yyy.com:type | com.yyy.jp |
| ... | ... | ... |

901  902  903

IMAGE FORMING APPARATUS EQUIPPED WITH NFC TAG, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium, and more particularly to an image forming apparatus equipped with an NFC tag that is capable of performing short-range wireless communication, a method of controlling the same, and a storage medium.

Description of the Related Art

In recent years, NFC (Near Field Communication) which is a type of short-range wireless communication (contactless communication) has come into widespread use in various fields. NFC is a system having a very short communication distance, and is controlled such that wireless communication is established when NFC-equipped devices having an NFC function are made close to each other within several centimeters, and is disconnected when the devices are made far from each other.

A smart poster is a system in which an NFC tag having information written therein is embedded in a poster, and a mobile terminal equipped with an NFC reader/writer is held over the poster, whereby the information written in the NFC tag is read by the mobile terminal. Various information can be written in an NFC tag, and for example, when a URL of a site to which a user is desired to be guided is written in an NFC tag, a mobile terminal having read the NFC tag starts a Web browser, whereby the user can be guided to the desired site.

In the above-described system, special software other than the Web browser is not required to be installed on the mobile terminal. Further, the ease of acquiring information makes the system high in customer convenience, and further, the use of the NFC tag which is inexpensive and requires no power supply makes it possible to introduce the system at low costs. For this reason, there has also been proposed a printing system which is comprised of mobile terminals each equipped with an NFC reader/writer and a printer equipped with an NFC tag, and makes it possible to check the status of the printer and give a print instruction to the printer from each mobile terminal. In such a system, a user is required to install a dedicated application in the mobile terminal in advance, and start the application before using it. More apparatuses other than the printer come to be equipped with various NFC tags, but it is troublesome for a user to select and start an application for each associated one of the devices. To cope with this, there has been proposed a technique e.g. in Japanese Patent Laid-Open Publication No. 2013-45462.

Japanese Patent Laid-Open Publication No. 2013-45462 discloses an NFC terminal incorporating an NFC application management device that analyzes, when installing each application using the NFC technique in the NFC terminal, NFC header information of the application to be installed, and forms a list of such applications. If no NFC header information is included in an application to be installed, the NFC application management device transmits application information to an NFC management server. The NFC management server transmits the corresponding NFC header information to the NFC application management device based on the received application information. Further, upon receipt of an application request from the NFC application management device, the NFC management server creates a list of applications which are compatible with the NFC header information, and transmits the created list to the NFC application management device. With such a configuration described above, it is possible to cause the NFC terminal to automatically select a compatible application based on the header information and execute the selected application.

On the other hand, there has been proposed a technique in which information on an application which is desired to be started is written in a specific area of an NFC tag, and the application is automatically started on a mobile terminal based on the application information read from the NFC tag. Examples of the application information include one written in a general form (URI) irrespective of an OS (Operation System) of the mobile terminal, and one written in a form which is different on an OS-by-OS basis (application package). In the case of the URI form, if an application desired to be started has not been installed in the mobile terminal, the mobile terminal does not respond thereto. On the other hand, in the case of the application package form, if an application desired to be started has not been installed in the mobile terminal, the OS of the mobile terminal can start a download service to thereby download the desired application, which is very convenient to the user.

However, a plurality of application information items each written for an associated OS cannot be written in the NFC tag. Therefore, to use the application package form, the printer is required to know the OS of the mobile terminal in advance.

SUMMARY OF THE INVENTION

The present invention provides a technique that makes it possible to automatically start a desired application without being dependent on an OS of a mobile terminal only by causing the mobile terminal to touch an image forming apparatus.

In a first aspect of the present invention, there is provided an image forming apparatus equipped with an NFC tag that is capable of performing short-range wireless communication with a mobile terminal, comprising a determination unit configured to determine an OS (Operating System) of the mobile terminal, and a first writing unit configured to write application information associated with the OS determined by the determination unit, in the NFC tag.

In a second aspect of the present invention, there is provided a method of controlling an image forming apparatus equipped with an NFC tag that is capable of performing short-range wireless communication with a mobile terminal, comprising determining an OS (Operating System) of the mobile terminal, and writing application information associated with the OS determined by said determining, in the NFC tag.

In a third aspect of the present invention, there is provided a non-transitory computer-readable storage medium storing a computer-executable program for performing a method of controlling an image forming apparatus equipped with an NFC tag that is capable of performing short-range wireless communication with a mobile terminal, wherein the method comprises determining an OS (Operating System) of the mobile terminal, and writing application information associated with the OS determined by said determining, in the NFC tag.

According to the present invention, it is possible to automatically start a desired application without being dependent on an OS operating on a mobile terminal only by causing the mobile terminal to touch an image forming apparatus. Further, when a necessary application has not been installed in the mobile terminal, it is possible to easily download the necessary application without being dependent on the OS of the mobile terminal.

Further features of the present invention will become apparent from the following description of exemplary embodiments (with reference to the attached drawings).

BRIEF DESCRIPTION OF THE DRAWINGS

FIG. 8 is a diagram showing an example of a table indicative of information to be written in an NDEF record according to an OS determined based on the user agent character string shown in FIG. 7.

DESCRIPTION OF THE EMBODIMENTS

The present invention will now be described in detail below with reference to the accompanying drawings showing embodiments thereof.

Figure 1:
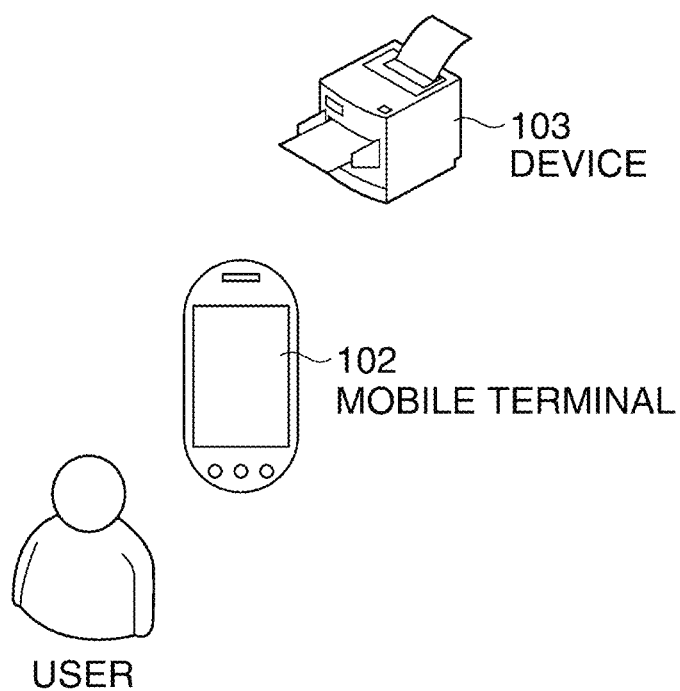
FIG. 1 is a diagram showing an example of an environment in which an image forming apparatus according to an embodiment of the present invention is installed.

FIG. 1 is a diagram showing an example of an environment in which an image forming apparatus according to an embodiment of the present invention is installed.

Referring to FIG. 1, a mobile terminal 102 is implemented e.g. by a smartphone, a compact laptop personal computer, or a tablet terminal, which is capable of performing NFC wireless communication. A device 103 is an image forming apparatus that is capable of performing NFC wireless communication, and is implemented by a printer or an MFP (Multifunction Peripheral). In the present embodiment, the device 103 will be described as a host based printer without a display panel.

The device 103 and the mobile terminal 102 can be connected to communicate with each other by NFC (Near Field Communication). Further, the device 103 supports an RUI (Remote User Interface) function for performing management of the device 103 using a Web browser on the mobile terminal 102 or a PC (not shown). A user starts the Web browser on the mobile terminal 102, and specifies an IP address of the device 103 as a URL, whereby the user can display an RUI screen of the device 103, and use the RUI. By using the RUI function, the user can access the device 103 from the Web browser via a network to check conditions of the device 103 and job history, and make various settings. The Web browser is one of programs each called an HTTP user agent for accessing a Web server, such as the RUI, by using the HTTP protocol. In the HTTP protocol, a request is transmitted which contains an identifier of each user agent in the form of a user agent character string.

Figure 2:
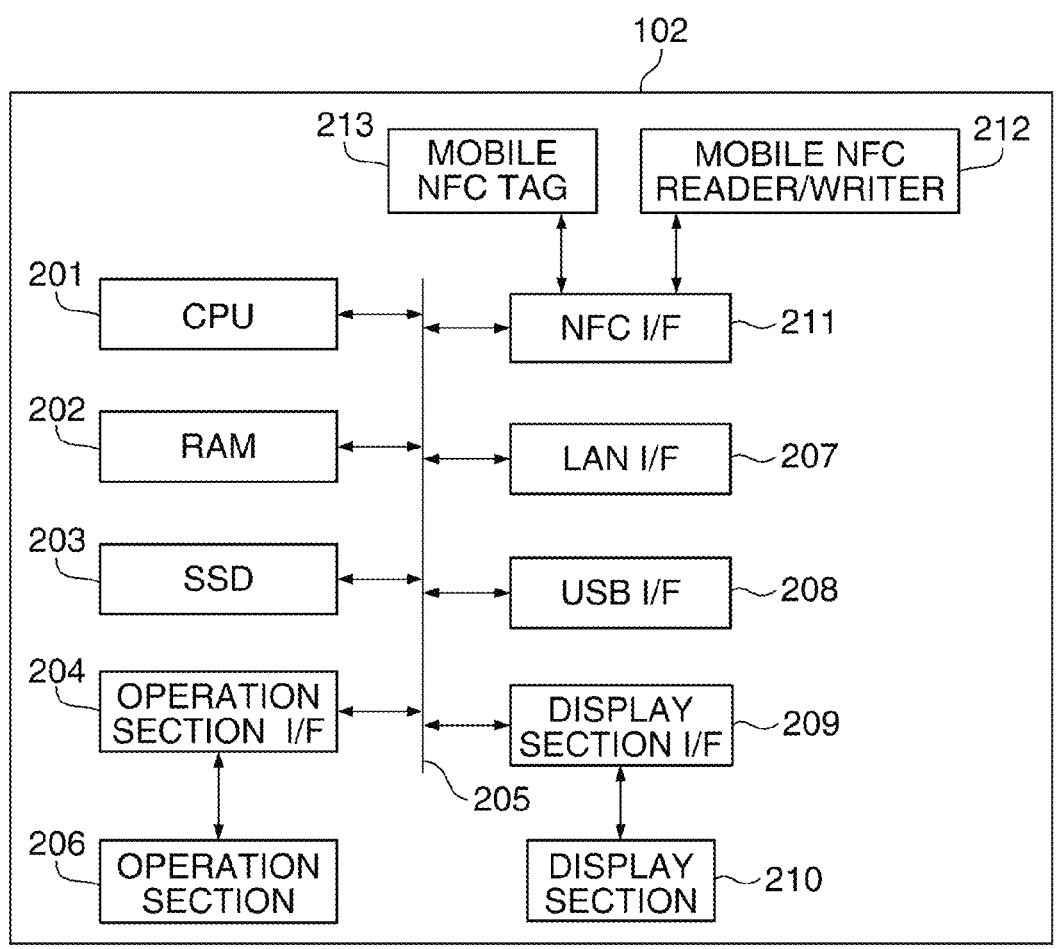
FIG. 2 is a diagram showing an example of the hardware configuration of a mobile terminal appearing in FIG. 1.

FIG. 2 is a diagram showing an example of the hardware configuration of the mobile terminal 102 appearing in FIG. 1.

Referring to FIG. 2, a CPU 201 is a processor that controls the overall operation of the mobile terminal 102. A RAM 202 is a work memory used for operation of the CPU 201, and is also used as a program memory storing programs. An SSD 203 is a so-called semiconductor disk, and stores an OS (Operating System) and various programs.

An operation section interface 204 is an interface for connecting between an operation section 206 and a system bus 205, and receives input signals from the operation section 206. Further, the operation section interface 204 transfers information input from the operation section 206 to the CPU 201.

A display section interface 209 is an interface for connecting between a display section 210 and the system bus 205, and outputs output signals to the display section 210 under the control of the CPU 201.

A LAN interface 207 is an interface for connecting to a LAN (Local Area Network) including a wireless LAN, and is used for performing communication with other devices via the LAN.

A USB interface 208 is a functional block for connecting to other devices by using a USB (Universal Serial Bus), and is used for performing communication with other devices via the USB.

An NFC interface 211 is an interface for connecting between a mobile NFC reader/writer 212 and a mobile NFC tag 213, and the system bus 205. The NFC interface 211 outputs signals to the mobile NFC reader/writer 212 and the mobile NFC tag 213 under the control of the CPU 201. Further, the NFC interface 211 receives a signal output from the mobile NFC reader/writer 212, and transfers the received signal to the CPU 201.

The mobile NFC reader/writer 212 is a functional block that generates an electromagnetic field enabling communication only in a short distance to thereby enable short-range wireless communication between NFC-equipped devices. The mobile NFC reader/writer 212 is capable of reading information written in an NFC tag of an NFC-equipped device, and writing information into the NFC tag.

The mobile NFC tag 213 is a functional block that is capable of performing short-range wireless communication with the NFC reader/writer of an NFC-equipped device. In the present embodiment, the mobile NFC reader/writer 212 will be described as an RFID reader/writer, and the mobile NFC tag 213 as an IC tag.

Figure 3:
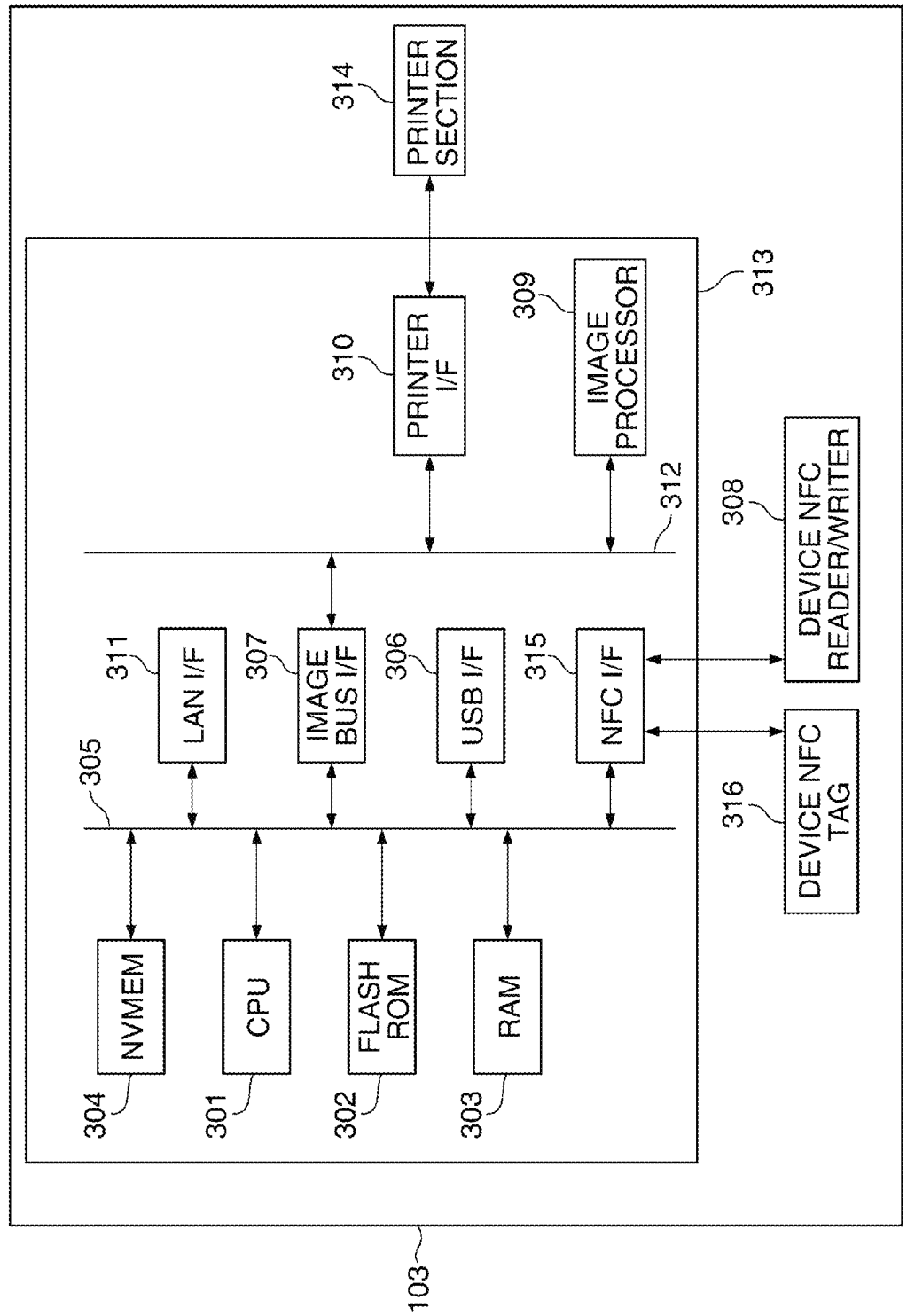
FIG. 3 is a diagram showing an example of the hardware configuration of a device appearing in FIG. 1.

FIG. 3 is a diagram showing an example of the hardware configuration of the device 103 appearing in FIG. 1.

Referring to FIG. 3, a controller unit 313 connects to a printer section 314 which functions as an image output unit, and inputs and outputs image data and device information.

In the controller unit 313, a CPU 301 is a processor that controls the overall operation of the device. A flash ROM 302 is a rewritable nonvolatile memory, and store various control programs for controlling the device. The various programs stored in the flash ROM 302 include a Web server that realizes the RUI.

A RAM 303 is a work memory used for operation of the CPU 301, and is also used as a program memory storing programs and an image memory for temporarily storing image data. An NVMEM 304 is a nonvolatile memory for storing setting information and so forth.

A USB interface 306 is an interface for connecting to other devices by using a USB. A LAN interface 311 is an interface for connecting to a LAN including a wireless LAN, and is used for communicating with other devices via the LAN.

An NFC interface 315 is an interface for connecting between a device NFC reader/writer 308 and a device NFC tag 316, and a system bus 305. The NFC interface 315 outputs signals to the device NFC reader/writer 308 and the device NFC tag 316 under the control of the CPU 301. Further, the NFC interface 315 receives a signal output from the device NFC reader/writer 308, and transfers the received signal to the CPU 301.

The device NFC reader/writer 308 is a functional block that generates an electromagnetic field enabling communication only in a short distance to thereby enable short-range wireless communication between NFC-equipped devices. The device NFC reader/writer 308 is capable of reading information written in an NFC tag of an NFC-equipped device, and writing information into the NFC tag.

The device NFC tag 316 is a functional block that is capable of performing short-range wireless communication with an NFC reader/writer of an NFC-equipped device.

An image bus interface 307 is a bus bridge that connects between the system bus 305 and an image bus 312 that transfers image data at high speed, and converts data structure.

The image bus 312 is implemented e.g. by a PCI bus or an IEEE 1394 bus. The image bus 312 is connected to functional blocks described hereafter.

A printer interface 310 connects between the printer section 314 and the controller unit 313, performs synchronous-asynchronous conversion of image data, and exchanges data.

An image processor 309 performs image processing, such as correction, processing, and editing, on input image data, and performs processing, such as printer correction and resolution conversion, on print output image data. Further, in addition to these, the image processor 309 rotates image data, and compresses or expands multi-valued image data by JPEG, and compresses or expands binary image data e.g. by JBIG, MMR or MH.

The printer section 314 is an image output unit configured to print out raster image data as an image on a sheet by an electrophotographic method. The electrophotographic method involves using a photosensitive drum and a photosensitive belt. The printer section 314 starts its operation according to an instruction from the CPU 301.

Figure 4:
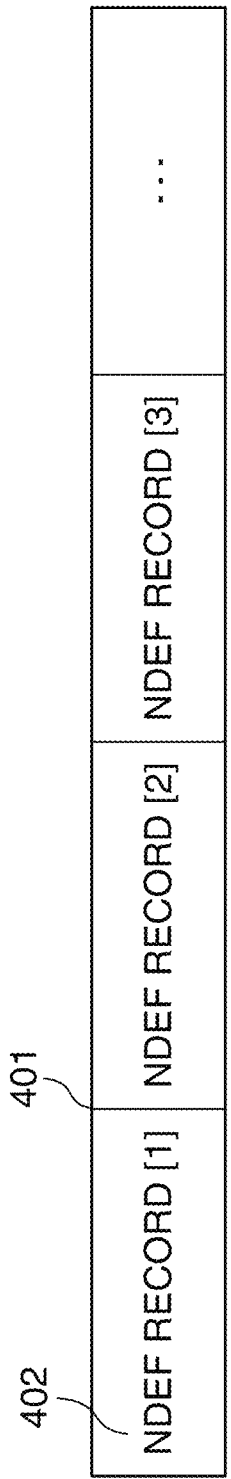
FIG. 4A is a diagram showing an example of a structure of NDEF data.
FIG. 4B is a diagram showing an example of a structure of an NDEF record appearing in FIG. 4A.

FIG. 4A is a diagram showing an example of a structure of NDEF data.

An NDEF (NFC Data Exchange Format) is a data format used when data is exchanged by NFC.

Referring to FIG. 4A, an NDEF message 401 is comprised of one or more NDEF records 402.

FIG. 4B is a diagram showing an example of a structure of each NDEF record 402 appearing in FIG. 4A.

Information entered in a field of Header 501 is header information. The header information includes information on whether the NDEF record 402 is a first one or a last one in the NDEF message 401, and information concerning the size of the NDEF message 401.

Information entered in a field of Type Length 502 is size information of a field of Type 504.

Information entered in a field of Payload Length 503 is size information of a field of Payload 505.

Information entered in the field of the Type 504 is type information of the Payload 505. The type information is differently interpreted depending on a value of TNF (Type Name Format) included in the field of Header 501. For example, in a case where the TNF is a value indicative of NFC Forum well-known-type, when "Sp" is specified in the Type 504, the Payload 505 is interpreted as smart poster data. On the other hand, when "U" is specified, the Payload 505 is interpreted as URI data.

Information entered in the field of the Payload 505 is data body.

Figure 5:
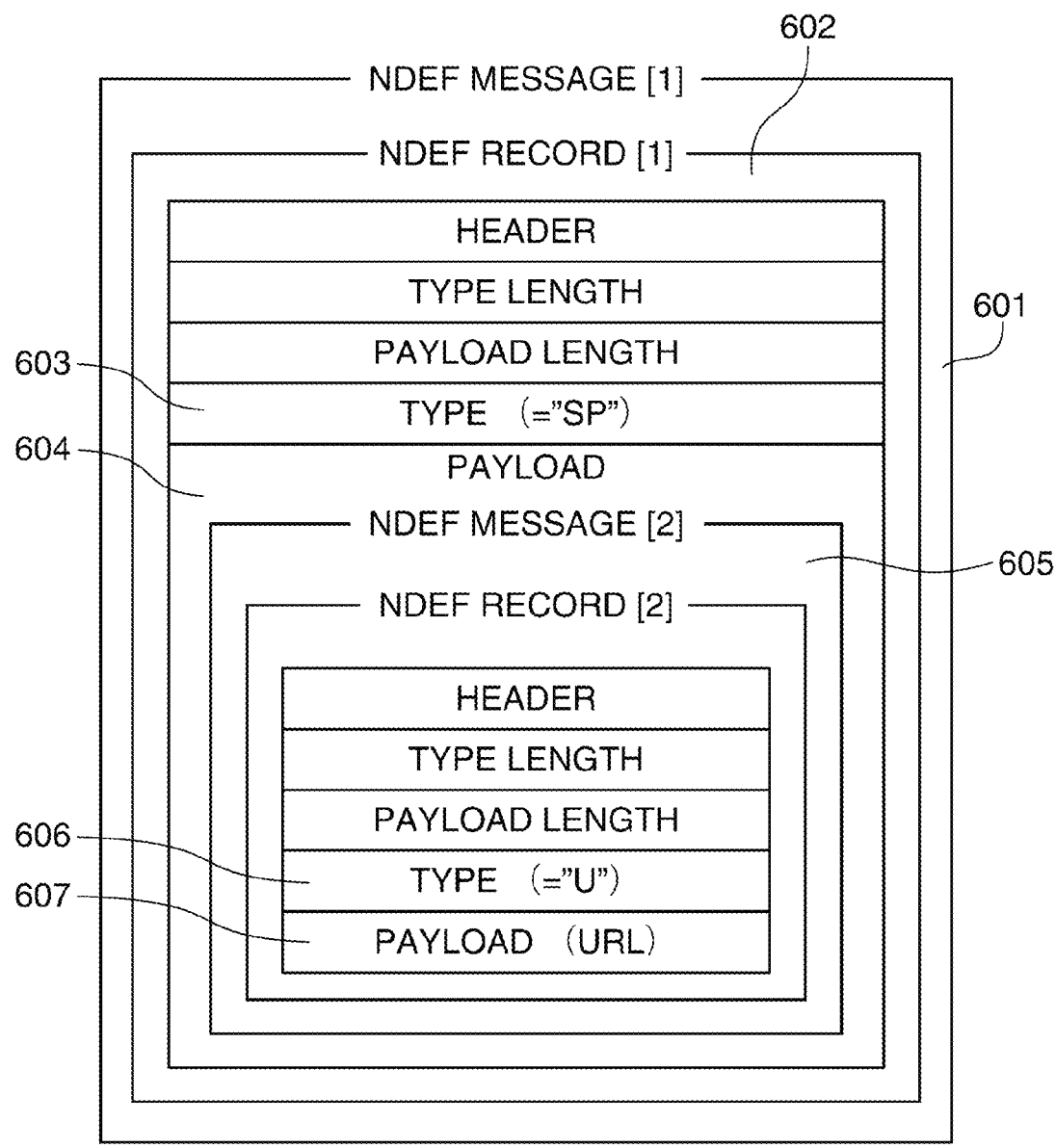
FIG. 5 is a diagram showing an example of a structure of smart poster data in the present embodiment.

FIG. 5 is a diagram showing an example of a structure of the smart poster data in the present embodiment.

NDEF message [1] 601 of the smart poster data has a nest structure, as shown in FIG. 5.

In Type 603 of NDEF record [1] 602, "Sp" is specified, and this indicates that the data is the smart poster data. NDEF message [2] 605 is stored in Payload 604.

In Type 606 of NDEF message [2] 605, "U" is designated, and this indicates that the data of Payload 607 is the URI data. Payload 607 stores a URL of the RUI of the device 103. The URL information of the RUI written in Payload 607 may be a top page of the normal RUI, or a dedicated page provided for mobile terminals. When the URL information is set to the top page of the RUI, control is performed such that an access to the RUI immediately after detecting an NFC touch interrupt is redirected to the dedicated page for mobile terminals.

The device 103 writes the URL of the RUI thereof in Payload 607 of the smart poster data in the device NFC tag 316.

Figure 6:
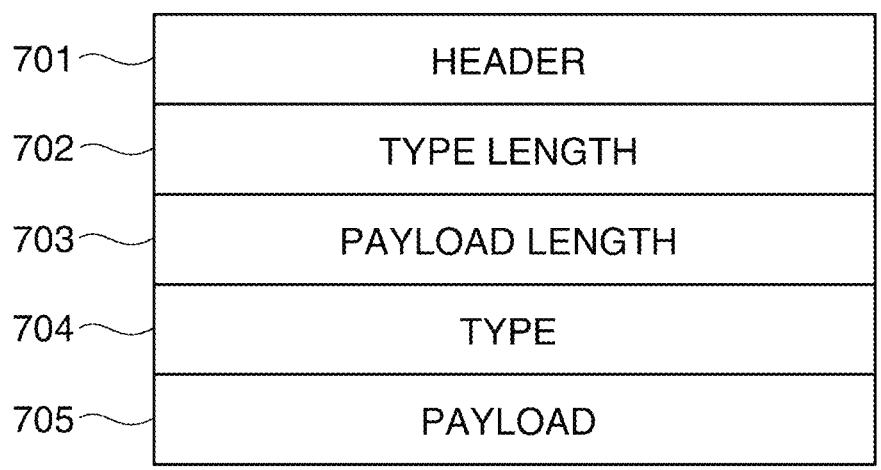
FIG. 6 is a diagram showing an example of a structure of the NDEF record for starting a specific application in the present embodiment.

FIG. 6 is a diagram showing an example of the structure of the NDEF record 402 for starting a specific application according to the present embodiment.

Referring to FIG. 6, Header 701, Type Length 702, and Payload Length 703 are the same as Header 501, Type Length 502, and Payload Length 503, described with reference to FIGS. 4A and 4B, respectively.

In a case where a specific application is started by the NDEF record 402, the TNF designated in the Header 701 is a value indicative of the NFC Forum external type. When the TNF is the NFC Forum external type, type information in Type 704 is specified according to a naming rule, defined by each OS, which defines e.g. that a domain name registered by a domain name registration organization should be used.

In Payload 705, an application package name for uniquely identifying an application to be started is designated.

Figure 7:
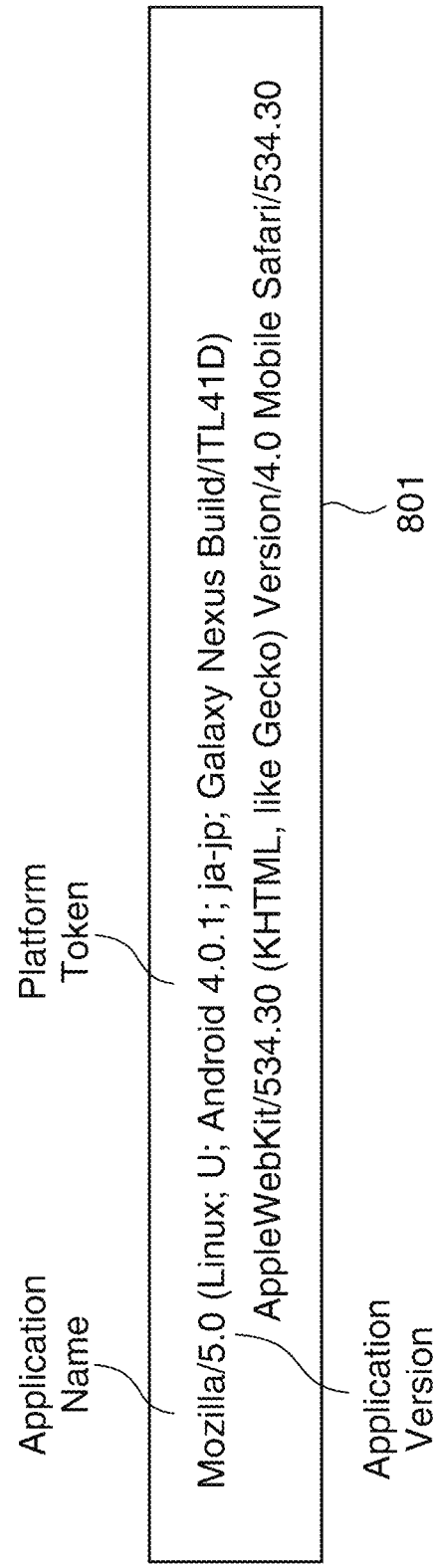
FIG. 7 is a diagram showing an example of a user agent character string transmitted when the mobile terminal accesses an RUI of the device.

FIG. 7 is a diagram showing an example of the user agent character string transmitted by the Web browser of the mobile terminal 102 when it accesses the RUI of the device 103.

A user agent character string 801 is an example of the user agent character string passed from a standard browser of a mobile terminal in which Android (registered trademark) OS 4.x has been installed, when the mobile terminal accesses the RUI. The user agent character string is formed by an application name, an application version, a platform token, and further, a detailed token which is different on a program-by-program basis.

In the user agent character string 801, "Android 4.0.1" is the platform token, and it is possible to determine based on this information that the OS of the mobile terminal 102 on which the Web browser having accessed the RUI is operating is Android.

Although in the illustrated example in FIG. 7, Android OS is taken as an example, any suitable one of various operating systems, such as Windows (registered trademark) and iOS (registered trademark) is defined by the user agent character string.

FIG. 8 is a diagram showing an example of a table indicative of information to be written in the NDEF record according to each OS determined based on the user agent character string 801 shown in FIG. 7.

The table shown in FIG. 8 is stored in the NVMEM 304. If the determined OS, denoted by reference numeral 901, is e.g. Android OS, information 902 defined by the OS and an application package name 903 of an associated application to be started are written in Type 704 and Payload 705, appearing in FIG. 6, respectively.

Similarly, also in a case where the determined OS 901 is XXX or YYY, the information 902 defined by the OS and the associated application package name 903 are written in Type 704 and Payload 705 appearing in FIG. 6, respectively.

Next, a description will be given of operation processes performed by the mobile terminal 102 and the device 103 when a user causes the mobile terminal 102 to touch the device NFC tag 316 of the device 103, with reference to FIGS. 9 and 10, respectively.

Figure 9:
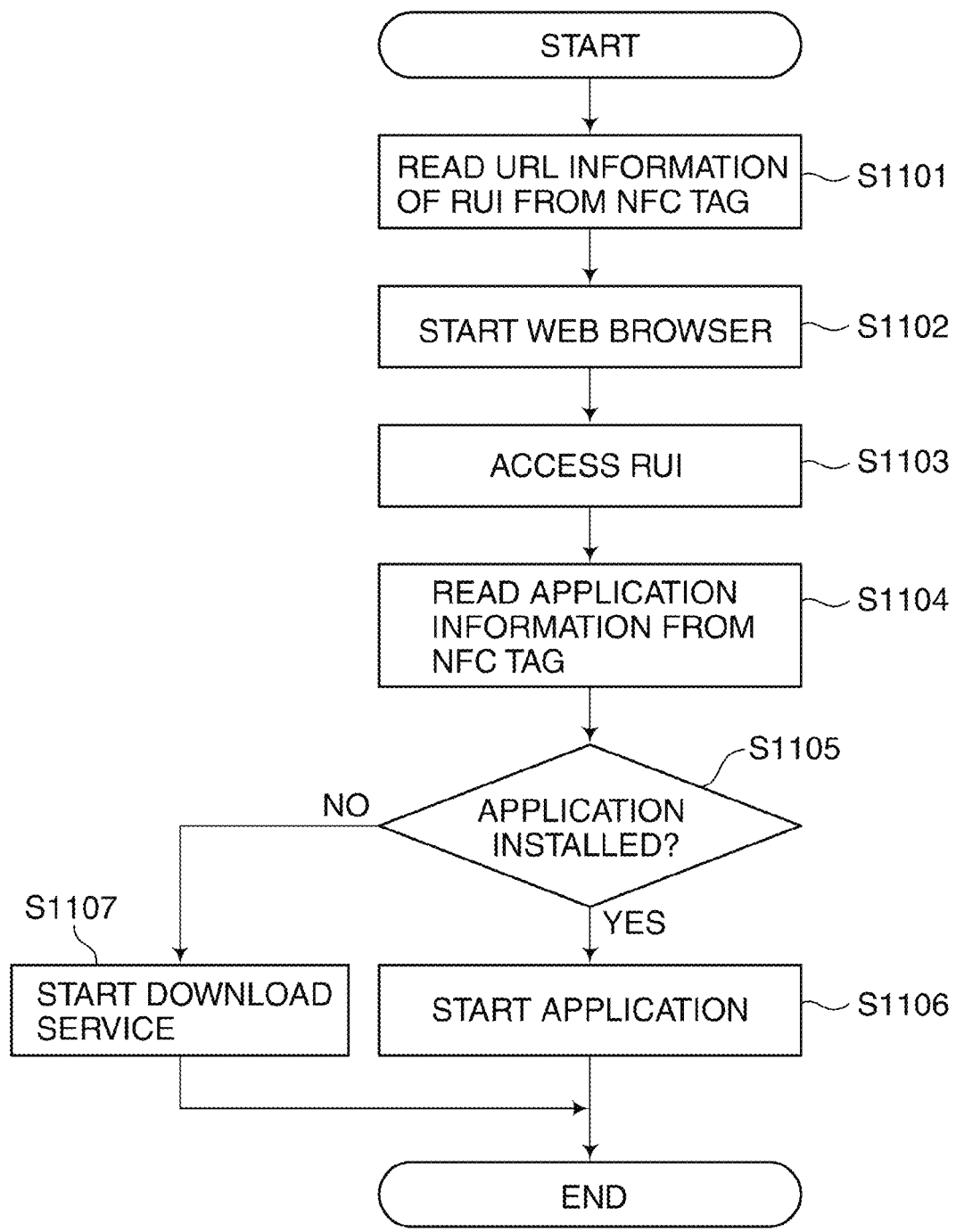
FIG. 9 is a flowchart of an operation process performed by the mobile terminal when a user causes the mobile terminal to touch a device NFC tag of the device.

FIG. 9 is a flowchart of the operation process performed by the mobile terminal 102 when a user causes the mobile terminal 102 to touch the device NFC tag 316 of the device 103. The present process is basically realized by the CPU 201 executing a control program read from the SSD 203 or the like.

When the user causes the mobile terminal 102 to touch the device 103 (device NFC tag 316), the mobile NFC reader/writer 212 of the mobile terminal 102 reads the URL information of the RUI, which has been written in the device NFC tag 316 (step S1101).

The CPU 201 of the mobile terminal 102 starts the Web browser (step S1102), and accesses a URL of the URL information read from the device NFC tag 316 of the device 103 using the Web browser (step S1103). The Web browser transmits the user agent character string 801 when accessing the URL of the RUI. This function is a standard function of the Web browser.

As described hereinafter, upon accessing the URL of the RUI, a message (see FIG. 11) for prompting the user to cause the mobile terminal 102 to touch the device 103 again is displayed on the Web browser. Following the displayed message, the user causes the mobile terminal 102 to touch the device 103 (device NFC tag 316) again. Then, the mobile NFC reader/writer 212 of the mobile terminal 102 reads the application information (application package name written in Payload 705 in the case of the illustrated example) written in the device NFC tag 316 (step S1104).

If it is determined that the application having the application package name read by the mobile NFC reader/writer 212 has already been installed in the mobile terminal 102 (YES to a step S1105), the CPU 201 proceeds to a step S1106.

In the step S1106, the CPU 201 starts the above-mentioned application, followed by terminating the present process.

On the other hand, if it is determined that the application having the application package name read by the mobile NFC reader/writer 212 has not been installed in the mobile terminal 102 (NO to the step S1105), the CPU 201 starts an application download service of the OS of the mobile terminal 102 (step S1107). Then, the CPU 201 guides the user to a download page of the application, and prompts the user to download the application, followed by terminating the present process.

Figure 10:
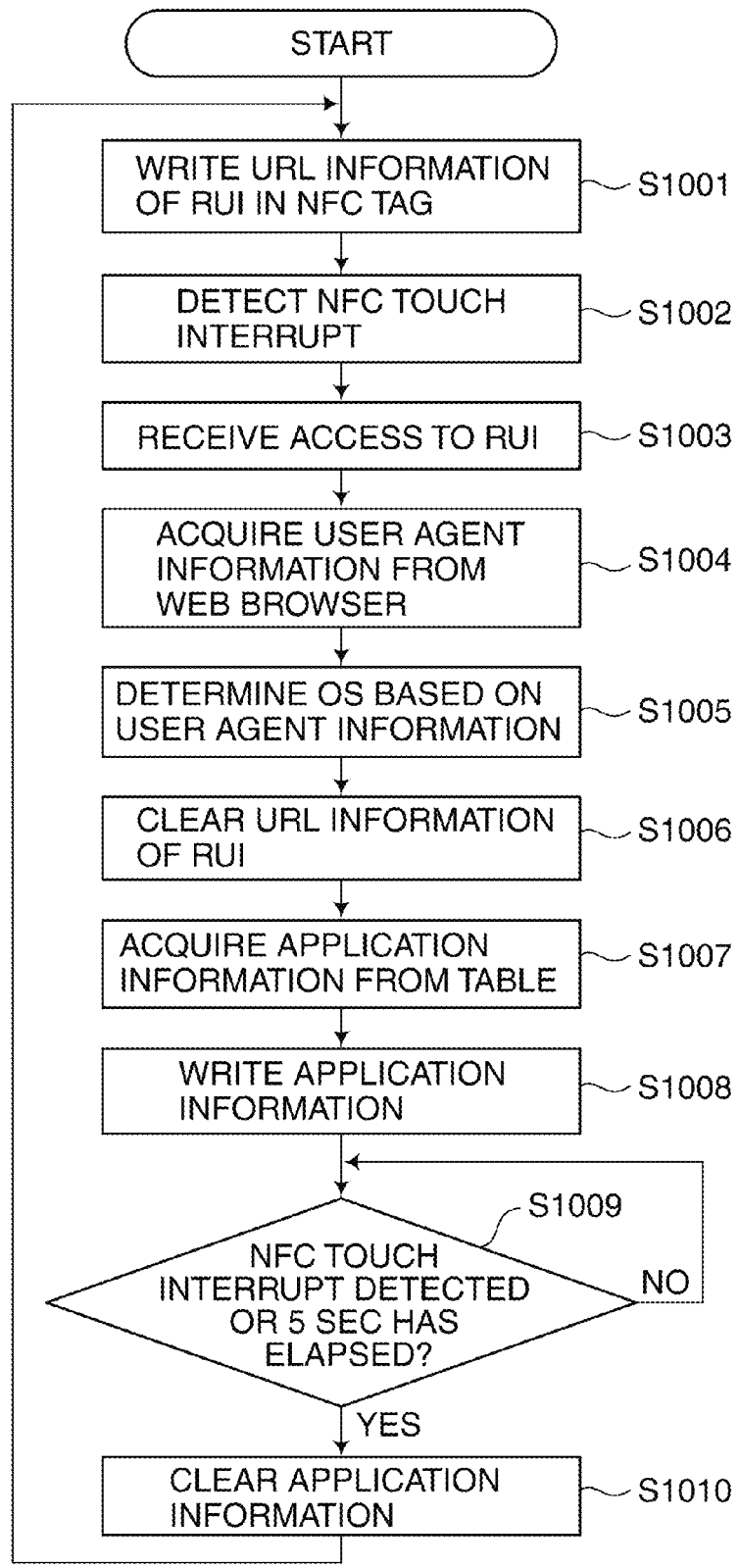
FIG. 10 is a flowchart of an operation process performed by the device, in association with the operation process in FIG. 9.

FIG. 10 is a flowchart of the operation process performed by the device 103, in association with the process in FIG. 9. The present process is basically realized by the CPU 301 executing a control program read from the flash ROM 302 or the like.

The CPU 301 writes the URL information of the RUI of the device 103 itself in Payload 705 of the NDEF record in the device NFC tag 316 via the NFC interface 315 (step S1001).

Next, when the user causes the mobile terminal 102 to touch the device NFC tag 316 of the device 103, the CPU 301 detects an NFC touch interrupt from the touch of the mobile terminal 102 (step S1002). This NFC touch interrupt means establishment of NFC communication between the device NFC tag 316 of the device 103 and the mobile NFC reader/writer 212 of the mobile terminal 102.

Next, the RUI accessed from the Web browser of the mobile terminal 102 (step S1003) sends HTML contents indicative of a message for prompting the user to cause the mobile terminal 102 to touch the device 103 again as a response. Then, the CPU 301 acquires the user agent character string 801 (user agent information) passed from the Web browser (step S1004), and determines the OS of the mobile terminal 102 based on the user agent character string 801 (step S1005).

Next, the CPU 301 clears the URL information of the RUI of the device 103 itself, which has been written in the Payload 705 of the NDEF record in the device NFC tag 316 in advance (step S1006).

Next, the CPU 301 acquires the application information associated with the OS determined in the step S1005 from the table defined in FIG. 8 (step S1007). This application information includes the type and the application package name.

Next, the CPU 301 writes the type and the application package name, which have been acquired in the step S1007, in Type 704 and Payload 705 of the NDEF record (step S1008). At this time, the NFC Forum external type is specified in the TNF of Header 701 of the NDEF record.

Next, the CPU 301 detects an NFC touch interrupt from the second touch of the mobile terminal 102 (YES to a step S1009). Then, the CPU 301 clears the application information written in the NDEF record in the step S1008 (step S1010), and writes the URL of the RUI in the smart poster format (step S1001).

Note that also in a case where the second touch interrupt is not detected even when a predetermined time period (five seconds in the illustrated example) elapses after the URL of the RUI is accessed after detection of the first NFC touch interrupt (YES to the step S1009), the process also proceeds to the step S1010.

In the step S1010, the CPU 301 clears the application information written in the NDEF record, and returns to the step S1001, wherein the CPU 301 writes the URL of the RUI in the smart poster format.

Figure 11:
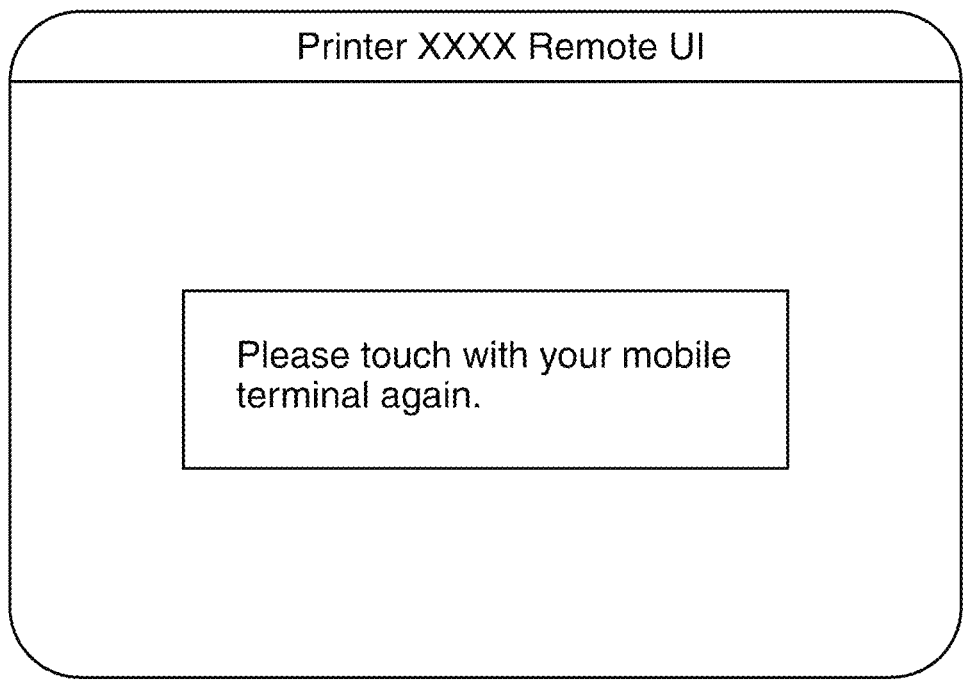
FIG. 11 is a diagram showing an example of a screen displayed on the mobile terminal, when a user causes the mobile terminal to touch the device, and a Web browser is automatically started on the mobile terminal and accesses the RUI of the device.

FIG. 11 is a diagram showing an example of a screen displayed on the mobile terminal 102, when the user causes the mobile terminal 102 to touch the device 103, and the Web browser is automatically started on the mobile terminal and accesses the URL of the RUI.

When the Web browser of the mobile terminal 102 accesses the URL of the RUI after detection of the NFC touch interrupt in the step S1002, the CPU 301 causes the Web browser to display the illustrated message for prompting the user to cause the mobile terminal 102 to touch the device 103 again. This makes it possible to prevent degradation of usability of the mobile terminal 102 on which the Web browser having directly accessed the URL of the RUI is operating.

As described above, URL information of an RUI is written in an NFC tag of a device, and when short-range wireless communication is established by causing a mobile terminal to touch the NFC tag, the device acquires user agent information from a Web browser having accessed the URL of the RUI. Then, the OS of the mobile terminal is determined based on the user agent information. Then, the device deletes the URL information from the NFC tag, and then writes application information in the NFC tag based on the determined OS. The mobile terminal automatically starts the application based on the application information written in the NFC tag. On the other hand, when the associated application has not been installed in the mobile terminal, the mobile terminal is controlled to download the application from outside thereof using a download service of the OS. This makes it possible to automatically start a desired application without being dependent on the OS of a mobile terminal only by causing the mobile terminal to touch an image forming apparatus. Further, when a necessary application has not been installed in the mobile terminal, it is possible to easily download the necessary application without being dependent on the OS of the mobile terminal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-115748 filed Jun. 4, 2014, which is hereby incorporated by reference herein in its entirety.

What is claimed is:

1. A communication apparatus equipped with an NFC tag that is capable of performing short-range wireless communication with a mobile terminal, comprising:
   a first writing unit configured to write, in the NFC tag, access information for the mobile terminal to access the communication apparatus;
   an acquisition unit configured to acquire, in a case where the mobile terminal accesses the communication apparatus based on the access information, identification information for identifying an OS (Operating System) of the mobile terminal, from the mobile terminal;
   a determination unit configured to determine the OS of the mobile terminal based on the identification information; and
   a second writing unit configured to write application information associated with the OS determined by the determination unit, in the NFC tag.

2. The communication apparatus according to claim 1, wherein the access information indicates a URL for the mobile terminal to access an RUI (Remote User Interface) of the communication apparatus.

3. The communication apparatus according to claim 1, wherein the first writing unit writes the access information in the NFC tag, in a case where the application information has been read by the mobile terminal, or in a case where a predetermined time period elapses while the application information has not been read.

4. The communication apparatus according to claim 1, further comprising:
   a controlling unit configured to control, in a case where the mobile terminal accesses the communication apparatus based on the access information, the mobile terminal to display a message for prompting a user of the mobile terminal to cause the mobile terminal to touch the NFC tag again.

5. The communication apparatus according to claim 1, wherein the identification information is user agent information.

6. The communication apparatus according to claim 1, wherein the application information is information for causing the mobile terminal to start a specific application.

7. The communication apparatus according to claim 1, wherein the communication apparatus is a printing apparatus.

8. A method of controlling a communication apparatus equipped with an NFC tag that is capable of performing short-range wireless communication with a mobile terminal, the method comprising:
   writing access information for the mobile terminal to access the communication apparatus, in the NFC tag;
   acquiring, in a case where the mobile terminal accesses the communication apparatus based on the access information, identification information for identifying an OS (Operating System) of the mobile terminal from the mobile terminal;
   determining the OS of the mobile terminal based on the identification information; and
   writing application information associated with the determined OS, in the NFC tag.

9. A non-transitory computer-readable storage medium storing a computer-executable program for performing a method of controlling a communication apparatus equipped with an NFC tag that is capable of performing short-range wireless communication with a mobile terminal,
wherein the method comprises:
writing access information for the mobile terminal to access the communication apparatus, in the NFC tag;
acquiring, in a case where the mobile terminal accesses the communication apparatus based on the access information, identification information for identifying an OS (Operating System) of the mobile terminal from the mobile terminal;
determining the OS of the mobile terminal based on the identification information; and
writing application information associated with the determined OS, in the NFC tag.

* * * * *